United States Patent [19]

Miller

[11] 4,162,212

[45] Jul. 24, 1979

[54] COMBINATION PROCESS FOR OCTANE UPGRADING THE LOW-OCTANE $C_5$-$C_6$ COMPONENT OF A GASOLINE POOL

[75] Inventor: Stephen J. Miller, Emeryville, Calif.

[73] Assignee: Chevron Research Company, San Francisco, Calif.

[21] Appl. No.: 938,291

[22] Filed: Aug. 30, 1978

[51] Int. Cl.$^2$ .................. C07C 15/02; C07C 5/24; B01J 29/28

[52] U.S. Cl. .................. 208/79; 208/64; 208/80; 585/13; 585/302; 585/739; 585/751

[58] Field of Search ........................... 208/79

[56] References Cited

U.S. PATENT DOCUMENTS

| | | | |
|---|---|---|---|
| 2,905,619 | 9/1959 | Sutherland | 208/64 |
| 3,002,916 | 10/1961 | Hamilton | 208/64 |
| 3,700,585 | 10/1972 | Chen et al. | 208/111 |
| 3,729,409 | 4/1973 | Chen | 208/135 |
| 3,753,891 | 8/1973 | Graven et al. | 208/62 |
| 3,756,942 | 9/1973 | Cattanach | 208/137 |
| 3,770,614 | 11/1973 | Graven | 208/62 |
| 3,871,993 | 3/1975 | Morrison | 208/135 |
| 3,950,241 | 4/1976 | Bonacci et al. | 208/64 |

Primary Examiner—Delbert E. Gantz
Assistant Examiner—G. E. Schmitkons
Attorney, Agent, or Firm—D. A. Newell; R. H. Davies; M. K. Bosworth

[57] ABSTRACT

Low-octane $C_5$-$C_6$ gasoline pool mixtures or components are upgraded into improved-octane gasoline blendstock by (1) catalytically converting a minor yet significant portion of the $C_6$-fraction into a relatively high-octane stock using a unique crystalline aluminosilica zeolite catalyst, (2) isomerizing the $C_5$-fraction plus the remainder of the $C_6$-fraction, and (3) blending the converted $C_6$-portion with the $C_5$-$C_6$ isomerizate.

13 Claims, 3 Drawing Figures

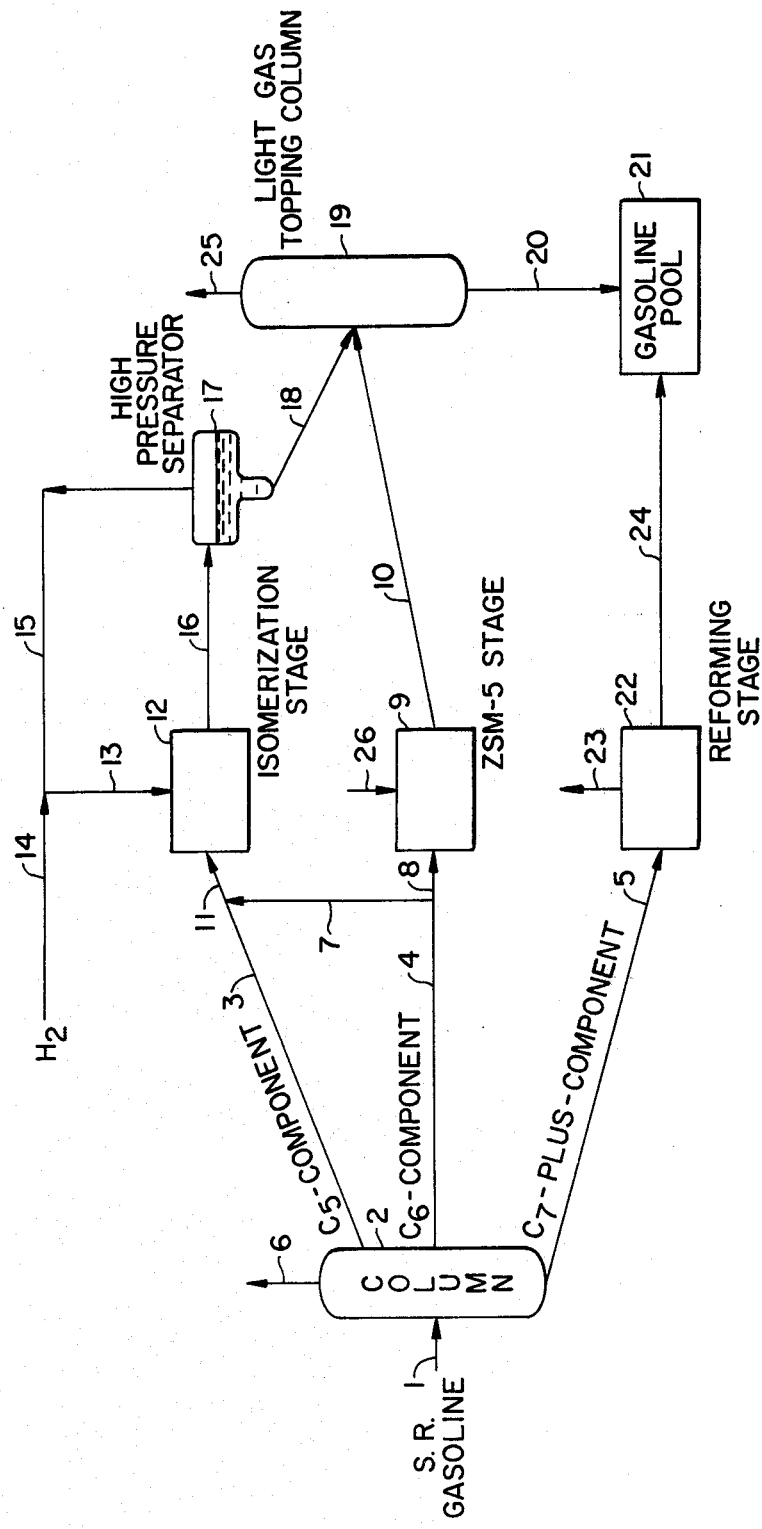
FIG._1.

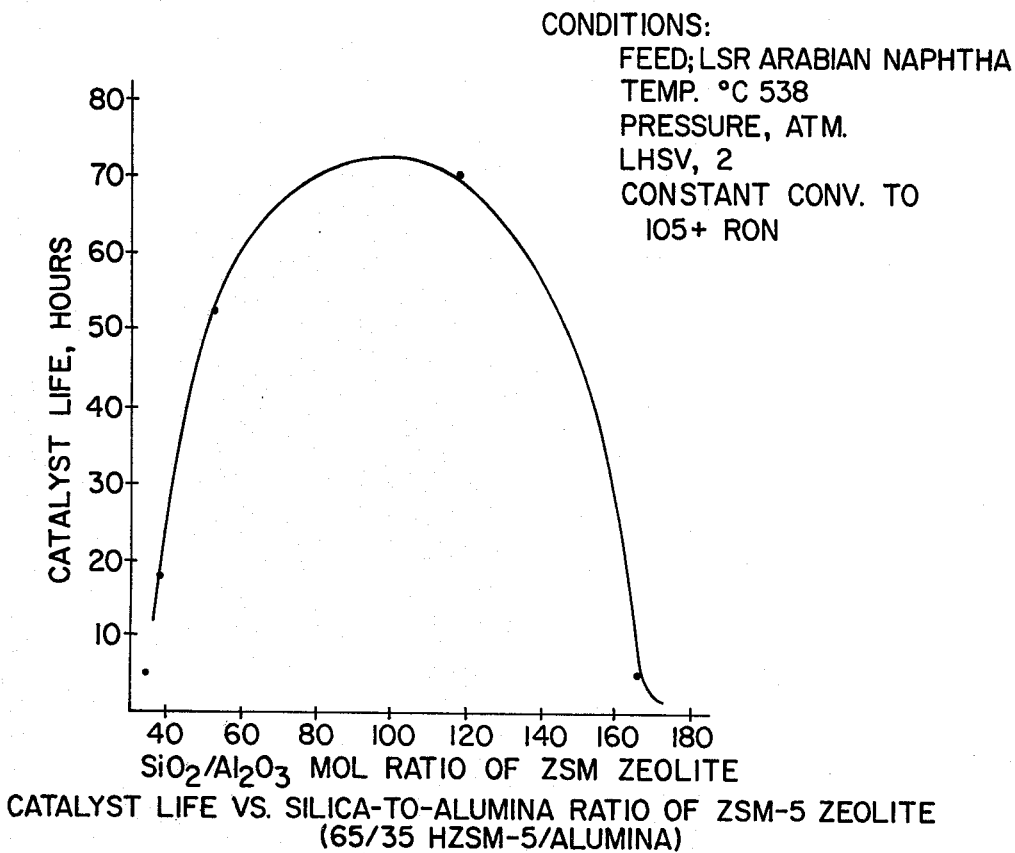
CATALYST LIFE VS. SILICA-TO-ALUMINA RATIO OF ZSM-5 ZEOLITE
(65/35 HZSM-5/ALUMINA)
FIG._2.
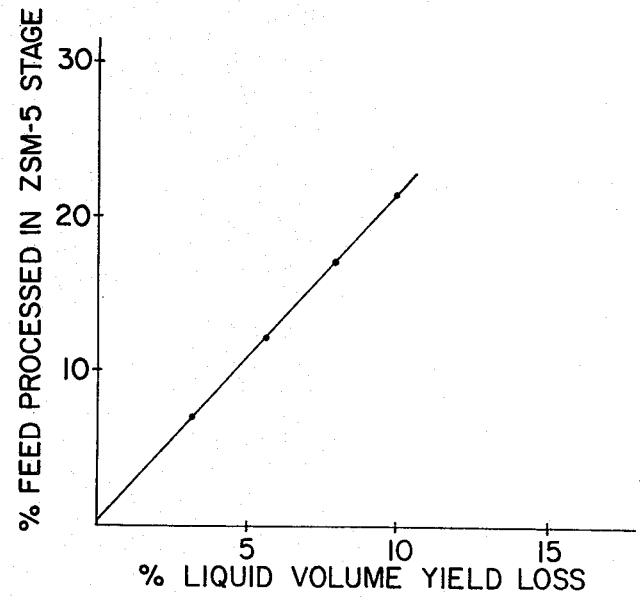
ZSM-5 CONVERSION VS. YIELD LOSS
FIG._3.

COMBINATION PROCESS FOR OCTANE UPGRADING THE LOW-OCTANE C₅–C₆ COMPONENT OF A GASOLINE POOL

BACKGROUND OF THE INVENTION

This invention is concerned with an improved process for upgrading the motor octane number of the low-boiling fraction or components of a gasoline pool.

A significant component of the gasoline pool obtained from processing crude oil is supplied by low-boiling hydrocarbons of the $C_5$–$C_6$ range. These hydrocarbons are normally deficient in terms of octane-number quality. In a typical refining of 50,000 barrels of crude oil, as much as 9000 barrels of low-boiling product may be produced. Common practice, despite the octane deficiency of this material, has been to include it in the gasoline pool and to make up the octane deficiency by use of lead-containing octane-improving additives. For environmental protection reasons, the addition of these additives to gasoline must be drastically limited or prohibited. Consequently, the refiner faces a serious need for an effective means for upgrading the octane number of the low-boiling hydrocarbon fraction or components of his gasoline pool.

Processes for upgrading the octane number of low-boiling hydrocarbons are known, for example see U.S. Pat. No. 2,905,619 and U.S. Pat. No. 3,770,614. Briefly, such processes suffer from disadvantages, including requirements for numerous fractionating steps, recycle streams, and processing stages; n-paraffin elimination (a yield loss) by a sacrificial cracking (shape-selective cracking) of n-paraffins to relatively low-value non-gasoline light gas by-products, and the like. A further notable and undesirable disadvantage is the usual inclusion of the $C_6$ paraffinic hydrocarbon component in feeds upgraded by conventional reforming operations. While this component may be modestly upgraded through some isomerization in a reforming stage, little, or only a minor portion, of it is converted to aromatic hydrocarbons. Consequently, the inclusion of $C_6$ paraffin in a reformer feed actually represents a substantial reduction in the efficiency of costly catalyst and reactor facilities.

An object of the present invention, in terms of yield-octane advantages, is to provide a process wherein the low-octane $C_5$–$C_6$ hydrocarbon components or fraction of a gasoline pool are effectively upgraded.

A further aspect of this invention is to provide a process for upgrading a gasoline pool wherein $C_6$ paraffinic hydrocarbons are upgraded in a process stage other than in a reformer.

Other objects and advantages of this invention will become more apparent from the discussion and examples hereinafter expressed.

SUMMARY OF THE INVENTION

In accordance with this invention, one or more of the above objectives is accomplished in a process wherein a hydrocarbon blend having a motor octane number above about 78 is produced from a $C_5$-component and a $C_6$-component, said components comprising mixtures of paraffinic hydrocarbons and, when admixed, boiling in the range of from about 25° C. to 70° C. and having a combined motor octane number below about 65, which comprises:

passing a portion of said $C_6$-component in contact with a ZSM-5-type crystalline aluminosilicate in at least one of the HZSM-5 and Zn-HZSM-5 forms under a temperature condition within the range of 400° to 550° C. and a pressure condition within the range of from about 0.5 to 10 atmospheres to produce a resulting hydrocarbon mixture having a motor octane number above about 100, said zeolite having a silica-to-alumina mol ratio in the range of from about 40 to 160, preferably 75 to 120, more preferably 95 to 105, and said portion, based upon the sum of the volumes of said components, being in the range of from about 10 to 40, preferably 15 to 25, percent thereof;

passing said $C_5$-component and any remainder of said $C_6$-component in contact with a hydrocarbon-isomerizing catalyst under isomerizing conditions, including a temperature condition within the range of from about 0° C. to 400° C. and a pressure condition within the range of from about 0.5 to 100 atmospheres to produce a resultant hydrocarbon mixture having a motor octane number (ASTM D-357) above about 70; and combining at least a major portion of each of said resulting mixtures to produce said blend.

Other, and more preferred, aspects of this invention include the aforedescribed process wherein:

(a) the zeolite is in the Zn-HZSM-5 form;

(b) the blend is combined with a full or partial gasoline-boiling-range stock;

(c) the isomerizing catalyst is a chlorided composite of platinum and porous alumina;

(d) the $C_5$- and $C_6$-components are obtained by fractionally distilling a hydrocarbon feed having a motor octane number below about 75, particularly a light, straight-run fraction, boiling in the range of from about 25° C. to 70° C. and containing at least 10 volume percent each of $C_5$ and $C_6$ paraffinic components, into a lower-boiling fraction and an upper-boiling-range fraction using a cut-point temperature of about 54° C.;

(e) the $C_6$-component is contacted with the zeolite in the presence of an amount of a gas containing at least one hydrocarbon selected from the group consisting of propane, n-butane and isobutane, the amount being in the range of from about 1 to 100 weight percent of the $C_6$-containing component contacted with the zeolite, especially wherein at least a part of the gas is a by-product recycle stream.

DESCRIPTION OF THE DRAWINGS

The inventive concept in the context of the present process and a particularly preferred embodiment are illustrated by the drawings.

FIG. 1 is a schematic block-type flow diagram, in which each block represents one particular step, or stage, of the process. Conventional appurtenances, not believed necessary for a clear understanding of the illustrated combination process, have been omitted from the drawing. Details such as pumps, compressors, instrumentation and controls, heat-conservation circuits, miscellaneous valving, start-up lines and the like hardware, etc., are well within the purview of one skilled in the art. Likewise, with respect to material flow throughout the process system, only those major streams required to illustrate the relationships between the various zones are presented. Accordingly, various recycle lines, and vent gas streams, etc., have also been omitted.

FIG. 2 presents data illustrating the effect of the silica-to-alumina molar ratio of the ZSM-5-type zeolite upon its life as a catalyst in the process.

FIG. 3 presents once-through process data illustrating that, in the practical interest of limiting liquid volume yield loss, there must be only a limited conversion of the $C_6$-component in the ZSM-5 stage of the process. The catalysts employed in the isomerization and ZSM-5 stages were a palladium-containing composite of alumina and ultra-stable HY-sieve and a composite of alumina and Zn-HZSM-5, respectively. The feed was a light straight-run naphtha containing by volume 26, 60 and 14%, respectively, of $C_5$-, $C_6$- and $C_7$-components.

EMBODIMENT

FIG. 1 is a schematic process flow diagram illustrating a preferred embodiment of the invention. The process feed is a straight-run gasoline obtained from an Arabian crude oil. This gasoline is introduced via line 1 to distillation column 2, wherein it is separated into 3 major components, a $C_7$-plus component, a $C_6$-component and a $C_5$-component, and a minor light or vent gas component. In the fractionation, the cut points are about 54° C. and 70° C. The $C_5$- and $C_6$-components have motor octane numbers of about 73 and 60, respectively, and the following compositions:

| $C_5$-component, LV% | | $C_6$-component, LV% | |
|---|---|---|---|
| $C_4$ | 1.9 | $C_5$ | 3.4 |
| $iC_5$ | 32.7 | 2,3-DMB | 2.7 |
| $nC_5$ | 63.1 | MCP | 9.3 |
| $C_6$ | 2.3 | Cyclohexane | 3.1 |
| | | $nC_6$ | 21.2 |
| | | 2,3-DMP | 22.7 |
| | | $C_7$ | 19.4 |
| | | $C_6$—$C_7$ Aromatics | 2.7 |

Via lines 3, 4, 5 and 6, the $C_5$-, and $C_6$- and $C_7$-plus components and the light gas, respectively, are withdrawn from column 2 for processing or handling as discussed below.

The $C_6$-component in line 4 is separated into major and minor fractions by withdrawing the former fraction via line 7 for admixing with the $C_5$-component in line 3. The minor fraction, which, based upon the sum of the volumes of the $C_5$- and $C_6$-components is about 20% thereof, is passed via line 8 to ZSM-5 Stage 9 wherein it is octane-upgraded as a result of contact thereof with a ZSM-5-type catalyst in the presence of a recovered $C_3$-$C_4$ hydrocarbon stream (about 30–40 weight percent of the feed in line 8) under the following conditions:

| Temperature, °C. | 538 |
|---|---|
| Pressure, Atmospheres | 1 |
| LHSV, V/V/Hr. | 2 |

The resulting contacted feed to ZSM-5 Stage 9, having a motor octane number of about 112, is withdrawn from Stage 9 via line 10.

The catalyst in Stage 9 is a composite of HZSM-5 crystalline aluminosilica zeolite and alumina in a weight ratio, zeolite-to-alumina, of about 65 to 35, respectively. The zeolite has a silica-to-alumina mol ratio of about 95.

The $C_5$-component in line 3 plus the remainder of the $C_6$-component from line 7 is passed as a composite stream via line 11 to isomerization stage 12 wherein this stream is contacted in the presence of a composite (makeup hydrogen from line 14 and recycle hydrogen from line 15) hydrogen gas stream from line 13 with a chlorided platinum-alumina hydrocarbon isomerization catalyst. (See, for example, U.S. Pat. No. 3,789,082, T. J. Cook et al, which is incorporated herein by reference). The contact conditions include:

| | Broad | Preferred |
|---|---|---|
| Temperature, °C. | 120–200 | 130–180 |
| Pressure, Atmospheres | 10–45 | 15–25 |
| LHSV, V/V/Hr | 0.5–4 | 1–2 |
| $H_2$-to-Hydrocarbon mol ratio | 1–8 | 2–4 |

Via line 16 the resulting isomerizate having a motor octane number of about 76 is withdrawn from isomerization Stage 12 and passed to separator 17 wherein it is separated into a substantially hydrogen gas fraction and a liquid hydrocarbon fraction. The gas is withdrawn from separator 17 for recycle to the process via line 15, less a bleed stream, not shown, if desirable. Via line 18 the liquid fraction is passed to topping column 19, where together with the high-octane stream from line 10 the combined streams are separated into a light gas overhead stream and a $C_5$-$C_6$-composite liquid hydrocarbon stream having a motor octane number of about 79, which is withdrawn via line 20 and passed to gasoline pool reservoir 21. The light gas overhead stream, comprising $C_1$-$C_4$ hydrocarbons and a minor amount by weight (approximately 1300 SCF/bbl of LSR naphtha) of hydrogen gas is withdrawn via line 25 from column 19 and passed to a recovery stage, not shown, where $C_3$-$C_4$ hydrocarbons are separated for recycle to the process via line 26.

In a combination process, the $C_7$-plus component in line 5 is passed to reforming stage 22 wherein it is reformed under conventional reforming conditions (see, for example, U.S. Pat. No. 3,415,737, H. E. Kluksdahl, which is incorporated herein by reference) to produce a high-octane reformate and a light-gas $C_3$-$C_4$ by-product component. This by-product component is withdrawn from stage 22 via line 23 for recycle to the process via line 10. The reformate is withdrawn from stage 22 via line 24 and passed to storage in reservoir 21. Preferably, the reforming in stage 22 includes the use of a conventional platinum-alumina-rhenium-chloride catalyst composite (see, for example U.S. Pat. No. 4,082,697, P. W. Tamm, which is incorporated herein by reference).

PROCESS FEEDS

Hydrocarbon mixtures satisfactory for use as feeds for the process herein comprise paraffinic hydrocarbons boiling in the range of from about 25° to 70° C. or comprise separate paraffinic $C_5$- and $C_6$-components which when admixed boil in this range and have combined motor octane numbers below about 65 (ASTM Method). These mixtures and admixtures of the components, in general, are relatively undesirable as fractions of a gasoline pool or as gasoline blending stock. The hydrocarbon mixtures contain a $C_5$-component and a $C_6$-component and may contain minor amounts of $C_4$ and $C_7$ hydrocarbons. These mixtures, when fractionally distilled using a cut point in the range of 54° ±5° C., are separated into separate substantially $C_5$- and $C_6$-components. The amount of $C_6$-component in a feed mixture, or where separate $C_5$- and $C_6$-components are used, which is required for contacting with the ZSM-5 zeolite catalyst, varies depending upon the kinds and amounts of individual molecular species in the mixture or $C_5$- and $C_6$-components. In general, based upon the total volume of the mixture or of the components, an amount of $C_6$-component in the range of from about 10 to 40, preferably 15 to 25, volume percent is satisfactory to achieve for the desired blend a motor octane number (MON) of at least 78. As larger relative amounts of the $C_6$-component are contacted with the zeolite, the blend will have a higher MON. However, only a limited portion of the $C_6$-component should be so contacted. In FIG. 3, data are presented for a representative example (see discussion of FIG. 3 above) of the present invention which shows that as the amount of $C_6$-component contacted with the zeolite is increased, the liquid volume yield loss of gasoline-range product increases markedly. Thus, for practical purposes, only so much of the $C_6$-component should be contacted (converted) with the zeolite as needed to achieve a satisfactory MON (e.g., in the range of from about 78 to 85). The yield loss can be minimized by separating a light-gas cut of the $C_3$ and $C_4$ hydrocarbons from the resulting light gas by-product stream and recycling this cut to the ZSM-5 contacting stage of the process. Representative process feeds include the 25° to 70° C.-boiling fraction of light straight-run gasoline or of cracked gasoline as well as paraffinic composites or individual cuts of $C_5$- and $C_6$-forecuts recovered in refining petroleum and/or synthetic crude oils such as tar sand and shale oils and the like and combining and/or fractionating the resulting blends.

ZSM-5 Stage

Of primary concern in the ZSM-5 stage of the process herein are (1) the feed, (2) the catalyst, and (3) the conditions. Of secondary, yet significant, concern in terms of minimizing liquid volume yield loss, is the presence of recycled or externally obtained $C_3$ and/or $C_4$ paraffinic and/or olefinic hydrocarbons at the contacting of the feed with the catalyst.

In order to achieve an effective octane-yield advantage herein, the feed to the ZSM-5 stage must be poor in $C_5$ hydrocarbons and rich in $C_6$ hydrocarbons. The presence of $C_7$ hydrocarbons in this feed is also advantageous. However, the conversion of $C_7$ hydrocarbons in a reforming zone rather than in a ZSM-5 stage, in terms of octane improvement, is more advantageous. Therefore, at least a major portion of the feed to the ZSM-5 stage must be paraffinic $C_6$ hydrocarbons.

The catalyst required for the conversion of the $C_6$-component must be of the ZSM-5-type. These catalysts are known in the art and per se are not considered to be inventive. This type of zeolite is exemplified by ZSM-5, ZSM-11 and ZSM-35 and other similar materials. U.S. Pat. Nos. 3,702,886, R. J. Argauer et al, and 3,770,614, R. G. Graven, describe the ZSM-5 preparation, composition and related information, the entire contents of which are incorporated herein by reference. The H-ZSM-5 and/or Zn-H-ZSM-5 forms of the ZSM-5-type zeolites required herein are obtained by conventional base- and/or ion-exchange methods routinely employed in the zeolite art, including customary zeolite drying and calcining steps. Preferably, the ZSM-5 zeolites herein have minimal sodium contents, for example by weight, less than about 100 ppm, although ZSM-5 zeolites having a larger sodium content exhibit relatively useful catalytic activity for present purposes. In any case, in order that the zeolite catalyst exhibit a satisfactory catalyst life (the period between startup and the first regeneration or between successive regenerations), the zeolite per se must have a silica-to-alumina mol ratio in the range of from about 40 to 160, preferably 60 to 140, and more preferably 90 to 105.

In connection with the silica-alumina ratio of the ZSM-5 herein, a series of zeolites in the H-form and with varying ratios of silica-alumina were prepared and tested. The feed, mol ratios, test conditions and results are shown in FIG. 2. These data demonstrate that for a satisfactory catalyst life, the silica-to-alumina mol ratio of the ZSM-5 zeolite must be in the range of from about 40 to 160, and that for reasonably optimum results, it must be about 95 to 105.

The catalyst of the ZSM-5 stage may be in any convenient form, that is, as required for conventional fixed, fluid bed or slurry usage. Preferably this stage is of the fixed-bed type and the zeolite is composited with an inorganic binder or matrix and sized for customary fixed-bed use.

Representative binders include alumina, silica-alumina mixtures, naturally occurring and conventionally processed clays, e.g., bentonite and kaolin and the like, as well as other porous matrix materials such as silica-magnesia, silica-zirconia, silica-thoria, silica-titania and ternary compositions of these oxidic materials. The composite is desirably prepared by admixing the binder or matrix in the form of a cogel, or gel, with the zeolite followed by shaping and/or extruding to the desired form. The relative proportions of the zeolite and binder or matrix may vary widely with the zeolite content, ranging from about 5 to 95% by weight, preferably 35 to 80%, and more preferably about 65%. Alumina is a preferred matrix.

The conditions satisfactory for the contacting of the $C_6$-component in the ZSM-5 stage vary widely, depending, in the main, upon the particular feed compositions, catalyst and conversion desired. In general, these conditions are as follows:

|  | Broad | Preferred |
| --- | --- | --- |
| Temperature, °C. | 400 to 650 | 475 to 550 |
| Pressure, Atmospheres | 0.5 to 10 | 0.5 to 2 |
| LHSV, V/V/Hr | 0.5 to 20 | 1 to 4 |

ISOMERIZATION STAGE

The isomerization of the $C_5$-component plus any remainder of the $C_6$-component may be carried out using any suitable light paraffinic hydrocarbon isomerization catalyst and method. Numerous methods for this purpose have been described in the prior art and descriptions of representative methods are given in an article entitled "Advances in Isomerization" by P. A. Lawrence et al, Proceedings of Seventh World Petroleum Congress, Vol. IV, pp. 135–145, Elsevier Publishing Co. (1967). Other examples of processes for isomerizing such paraffins appear in the following U.S. Pat. Nos. 2,834,823, J. L. Patton et al; 3,190,939 and 3,527,835, H. A. Benesi; 3,577,479 and 3,578,725, D. E. Jost et al; 2,945,908, H. M. Stine et al; 3,301,917, J. J. Wise; and 3,789,082, T. J. Cook et al.

In a preferred embodiment, the isomerization is carried out using as the catalyst a chlorided composite of platinum dispersed upon porous alumina (e.g., Example 1 of U.S. Pat. No. 3,789,082). In another preferred embodiment, the catalyst employed is a composite of palladium and ultra-stable Y crystalline aluminosilica molecular sieve in the H-form (see, for example, U.S. Pat. No. 3,293,192, P. K. Maher et al for a description of ultra-stable Y-zeolite) dispersed in a porous alumina matrix. This catalyst is prepared by any suitable method. For example, an aqueous solution of a palladium salt is admixed with acid-peptized alumina hydrogel and, thereafter, the palladium is gravimetrically precipitated in finely divided form by admixing a minor amount of 1,2,3-benzotriazole in the hydrogel (see, for example, U.S. Pat. No. 3,978,001, J. A. Meyer). Next, the H-Y sieve is admixed into the alumina gel and the resulting composite is shaped (extruded), dried and calcined for use. Sufficient of the components are used to provide, on a dry basis for each 100 parts by weight, a composite containing alumina, ultra-stable Y-sieve and palladium in an amount of about 35, 65 and 0.3 parts. The relative amounts of these components may be varied widely as in the conventional practice and yet the catalyst will be effective for isomerizing the feed herein. The isomerization of a $C_5$–$C_6$ paraffinic hydrocarbon feed under hydrocarbon isomerizing conditions per se is not here considered as inventive.

What is claimed is:

1. A process for producing a hydrocarbon blend having a motor octane number above about 78 from a $C_5$-component and a $C_6$-component, said components comprising mixtures of paraffinic hydrocarbons and, when admixed, boiling in the range of from about 25° C. to 70° C. and having a combined motor octane number below about 65, which comprises:
   passing a portion of said $C_6$-component in contact with a ZSM-5-type crystalline aluminosilicate in at least one of the HZSM-5 and Zn-HZSM-5 forms under a temperature condition within the range of 400° to 550° C. and a pressure condition within the range of from about 0.5 to 10 atmospheres to produce a resulting hydrocarbon mixture having a motor octane number above about 100, said zeolite having a silica-to-alumina mol ratio in the range of from about 40 to 160, and said portion, based upon the sum of the volumes of said components, being in the range of from about 10 to 40 percent thereof;
   passing said $C_5$-component and any remainder of said $C_6$-component in contact with a hydrocarbon-isomerizing catalyst under isomerizing conditions, including a temperature condition within the range of from about 0° C. to 400° C. and a pressure condition within the range of from about 0.5 to 100 atmospheres to produce a resultant hydrocarbon mixture having a motor octane number above about 70; and
   combining at least a major portion of each of said resulting mixtures to produce said blend.

2. A process as in claim 1 wherein said components are obtained by fractionating a light straight-run naphtha.

3. A process as in claim 1 wherein said zeolite is in the Zn-HZSM-5 form.

4. A process as in claim 1 wherein said zeolite is in the H-ZSM-5 form.

5. A process as in claim 1 wherein at least a portion of said blend is combined with a full or partial gasoline-boiling-range gasoline stock or pool.

6. A process as in claim 1 wherein said isomerizing catalyst is a composite of palladium, ultrastable HY zeolite and alumina matrix.

7. A process as in claim 1 wherein said isomerizing catalyst is a chlorided composite of platinum and alumina.

8. A process as in claim 1 wherein said contacting with said ZSM-5 zeolite catalyst is in the presence of an amount of a gas containing at least one hydrocarbon selected from the group consisting of propane, n-butane and isobutane, said amount based upon said portion of said $C_6$-component, being in the range of from about 1 to 100 weight percent thereof.

9. A process as in claim 1 wherein said silica-to-alumina ratio is in the range of from about 75 to 120.

10. A process as in claim 1 wherein said silica-to-alumina ratio is in the range of from about 95 to 105 and said portion is in the range of from about 15 to 25 percent of said sum of the volumes.

11. A process as in claim 1 wherein said blend is admixed with a $C_7$-plus reformate obtained by reforming a $C_7$-plus straight-run gasoline component under conventional reforming conditions using a platinum-rhenium-chloride catalyst composite.

12. A process for upgrading a hydrocarbon feed boiling in the range of from about 25° C. to 70° C. and containing at least about 10 volume percent each of a $C_5$- and $C_6$-component, said feed having a motor octane number below about 65, which comprises:
   separating said feed into a lower-boiling-range fraction and an upper-boiling-range fraction, said fractions being obtained by fractionally distilling said feed using a cut-point temperature of about 54° C.;
   passing a minor portion of said fraction in contact with a ZSM-5-type crystalline aluminosilicate zeolite in at least one of the HZSM-5 and Zn-HZSM-5 forms under a temperature condition within the range of 400° to 550° C. and a pressure condition within the range of from 0.5 to 10 atmospheres to produce a first resulting fraction having a motor octane number above about 100;
   passing said lower fraction and the remainder of said upper fraction in contact with a hydrocarbon isomerizing catalyst under isomerizing conditions, including temperature conditions within the range of from about 0° C. to 400° C. and pressure conditions within the range of from about 0.5 to 100 atmospheres to produce a second resulting fraction having a motor octane number above about 70;
   combining at least a major portion of each of said resulting fractions to produce a blend having a motor octane number above about 78.

13. The process of claims 1 or 12 wherein said isomerizing conditions include a temperature within the range from 120° to 200° C., a pressure from 10 to 45 atmospheres, a liquid hourly space velocity from 0.5 to 4 and a hydrogen-to-hydrocarbon mole ratio from 1 to 8.

* * * * *

UNITED STATES PATENT AND TRADEMARK OFFICE
CERTIFICATE OF CORRECTION

PATENT NO. : 4,162,212
DATED : July 24, 1979
INVENTOR(S) : Stephen J. Miller

It is certified that error appears in the above-identified patent and that said Letters Patent are hereby corrected as shown below:

Claim 12, Col. 8, line 37, "said fraction" should read --said upper fraction--.

Signed and Sealed this

Sixth Day of November 1979

[SEAL]

Attest:

RUTH C. MASON
Attesting Officer

LUTRELLE F. PARKER
Acting Commissioner of Patents and Trademarks